US008161547B1

(12) United States Patent
Jennings et al.

(10) Patent No.: US 8,161,547 B1
(45) Date of Patent: Apr. 17, 2012

(54) MONITORING TRAFFIC TO PROVIDE ENHANCED NETWORK SECURITY

(75) Inventors: Cullen F. Jennings, San Jose, CA (US); Rohan W. Mahy, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 1581 days.

(21) Appl. No.: 10/807,219

(22) Filed: Mar. 22, 2004

(51) Int. Cl.
*H04L 29/06* (2006.01)
(52) U.S. Cl. .............................. 726/22; 726/11; 713/156
(58) Field of Classification Search .................... 726/13, 726/11, 12, 22, 14; 370/218; 713/158, 156
See application file for complete search history.

(56) References Cited

U.S. PATENT DOCUMENTS

| | | | |
|---|---|---|---|
| 5,825,890 A * | 10/1998 | Elgamal et al. ............... 713/151 |
| 5,970,475 A * | 10/1999 | Barnes et al. ............... 705/26.35 |
| 6,324,648 B1 * | 11/2001 | Grantges, Jr. ................... 726/12 |
| 6,530,022 B1 * | 3/2003 | Blair et al. ..................... 713/186 |
| 6,609,196 B1 | 8/2003 | Dickinson, III et al. ...... 713/154 |
| 6,704,873 B1 | 3/2004 | Underwood .................. 713/201 |
| 6,775,704 B1 * | 8/2004 | Watson et al. ................ 709/229 |
| 6,839,338 B1 | 1/2005 | Amara et al. ................. 370/338 |
| 6,873,988 B2 | 3/2005 | Herrmann et al. .............. 707/10 |
| 6,874,088 B1 * | 3/2005 | Stevens ............................. 726/6 |
| 6,978,364 B1 * | 12/2005 | Balaz et al. ................... 713/153 |
| 7,921,211 B2 * | 4/2011 | Larson et al. ................. 709/226 |
| 2002/0194292 A1 * | 12/2002 | King ............................. 709/213 |
| 2003/0149891 A1 * | 8/2003 | Thomsen ...................... 713/201 |
| 2005/0050357 A1 * | 3/2005 | Jeng et al. .................... 713/201 |

* cited by examiner

*Primary Examiner* — David Garcia Cervetti
(74) *Attorney, Agent, or Firm* — Baker Botts L.L.P.

(57) ABSTRACT

A communication system includes a traffic monitoring element that monitors network traffic between network components. The network traffic monitoring element monitors for security anomalies and, upon detecting a security anomaly, may respond appropriately. For example, the network traffic monitoring element may identify a security certificate communicated from a server application to a client application, determine the validity of the certificate, and disrupt further communications between the server application and the client application if the certificate is not valid.

16 Claims, 2 Drawing Sheets

MONITORING TRAFFIC TO PROVIDE ENHANCED NETWORK SECURITY

TECHNICAL FIELD OF THE INVENTION

The present invention relates generally to network security and, more particularly, to monitoring network traffic to provide enhanced network security.

BACKGROUND OF THE INVENTION

Many network applications rely upon transmissions that traverse inherently insecure communication paths. To protect these communications, developers have created mechanisms for establishing secure connections between network components, relying primarily upon setup and encryption processes.

SUMMARY OF THE INVENTION

In accordance with the present invention, techniques for monitoring network traffic to provide enhance network security are provided.

According to a particular embodiment, a method for monitoring network traffic to enhance security detects a network connection established between a client application and a server application across a communications network and monitors packets communicated between the client application and the server application. The method identifies a security certificate communicated from the server application to the client application, determines validity of the security certificate, and if not valid, disrupts further communications between the client application and the server application on the network connection.

Embodiments of the invention provide various technical advantages. These techniques can enable enhanced security above that provided by network applications. Moreover, certain embodiments may enable system level enforcement of security policies.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
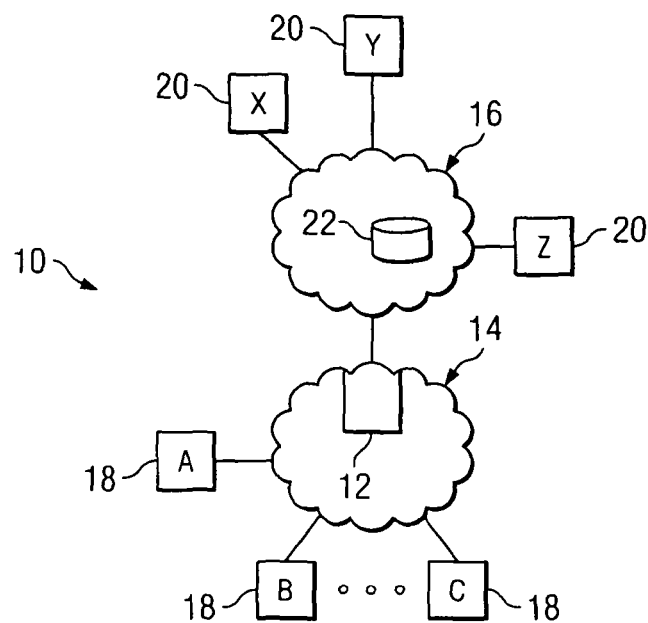
FIG. 1 illustrates a communication system that includes a firewall enabled to provide enhanced network security in accordance with various embodiments of the present invention.

FIG. 1 illustrates a communication system, indicated generally at 10, that includes a firewall 12 interconnecting an enterprise network 14 and a data network 16. In system 10, a number of clients 18 interconnect with other network devices using enterprise network 14. Similarly, any number of servers 20 may interconnect with other network devices using data network 16. During operation, clients 18 may access information or services provided by servers 20. To prevent unauthorized access to or interference with these communications, clients 18 and servers 20 support mechanisms to provide for secure communications. To provide enhanced security, firewall 12 monitors communications to detect potential security anomalies and, if appropriate, may provide responses to detected anomalies.

Data network 16 represents any suitable collection and arrangement of components capable of interconnecting communications equipment. For example, data network 16 may encompass some or all of networks such as the internet, the public switched telephone network (PSTN), and private networks. Any number of links and/or components within data network 16 may be susceptible to eavesdropping or other unauthorized activities. For example, a malicious third party may illicitly intercept communications between client 18 and server 20 that cross elements of data network 16 for any number of nefarious purposes.

Similar to data network 16, enterprise network 14 represents any suitable combination and arrangement of components that support communications between network equipment. As with data network 16, any number of links and/or components within enterprise network 14 may also be susceptible to eavesdropping or other unauthorized activities. In the embodiment illustrated, enterprise network 14 and data network 16 are shown as separate networks interconnected by firewall 12. This demonstrates a particular embodiment in which firewall 12 can monitor communications passing between enterprise network 14 and data network 16. However, it should be understood that the particular illustration is provided only as an example of a particular embodiment in which communications may be monitored to enhanced network security, and it will be apparent that the techniques detailed may be applicable to any number of different configurations of components.

Clients 18 represent hardware, including appropriate controlling logic, capable of interconnecting with other network components and establishing secure links with other components. Similarly, servers 20 represent hardware, including appropriate controlling logic, capable of carrying out communications with other network components and establishing secure links with some or all of these other components. In this description, it should be understood that the terms client and server are merely terms used for convenience, and the particular communication protocols and/or peer status of these components should not be implicated by these terms.

During operation, clients 18 and servers 20 may establish "connections" for the exchange of information. For example, a particular client 18 may establish a transmission control protocol (TCP) connection with a particular server 20. Client 18 and server 20 may then exchange communications across enterprise network 14 and data network 14 by way of firewall 12. For example, using the established TCP connection, client 18 and server 20 can exchange packets containing information. In particular circumstances, client 18 and server 20 may establish secure communications in order to prevent unauthorized access as these communications pass across various network elements.

To provide for secure communications, clients 18 and servers 20 support procedures to encrypt communications. According to particular embodiments, these procedures include a set up process whereby a communicating client 18 and server 20 exchange data that then permits encryption of subsequent communication. One such technique involves certificates. These certificates enable servers 20, through insecure communication, to deliver information for encrypting subsequent data.

According to particular embodiments, a certificate includes information such as a public key, a server identifier, an expiration date, and a certifying authority signature. The public key permits encryption of subsequent data using any appropriate encryption protocol, such as RSA, ECC, DSS, or other suitable protocol. The server identifier indicates the particular server or domain that has been authorized to use the certificate. The expiration date indicates a date at which the certificate becomes invalid. The certifying authority signature provides a "trusted" digital signature applied by a certifying authority. The information maintained within the certificate enables client 18 to validate the certificate and to encrypt subsequent transmissions.

For example, to validate a received certificate, client 18 may verify that the certificate has not expired, that the server identifier in the certificate matches server 20 communicating the certificate, and that the certifying authority signature matches to a valid certifying authority. A number of these certifying authorities exist and distribute security information which may, for example, be maintained within operating systems or other applications to permit the validation of certifying authority signatures. Also, in certain circumstances, the certifying authority signature may indicate a nested sequence of certificates. For example, a root certifying authority may grant a particular server 20 permission to generate multiple certificates for a particular domain. Thus, to properly check validity of a certificate, client 18 may need to verify a chain of trust established by nested certificates.

In certain instances, servers 20 may wish to invalidate otherwise valid certificates. For example, if a third party has obtained access to private keys associated with one or more certificates, servers 20 may wish to revoke the validity of those affected certificates. To provide this functionality, system 10 may include certificate revocation lists (CRLs) 22 that maintain lists of revoked certificates. Thus, to ensure validity of an otherwise valid certificate, clients 18 may also need to check the validated certificate against one or more CRLs 22.

Using the certificates, clients 18 and servers 20 can establish secure links for communication. For example, consider client 18 labeled A connecting with server 20 labeled X. During setup, server X may communicate a certificate to client A. Upon validating the certificate, client A can then use the public key from that certificate for subsequent transmissions to server X. Either using a similar process or using the secured communications, client A can communicate encryption data to server X, such that server X can encrypt transmissions to client A. Subsequent communications between client A and server X may then be encrypted to prevent unauthorized access to these communications by third parties.

Clients 18 and servers 20 may establish secured links using a number of different techniques. One such technique involves client 18 attempting to connect to a secured portion of server 20. For example, with hypertext transport protocol secure (HTTPS), client 18 may attempt to connect to a particular secure port maintained by server 20. Another technique involves use of an unspecified link that may then optionally be switched into a secured link. For example, simple mail transport protocol (SMTP) can, in appropriate circumstances, support the establishment of a secured link on a previously unsecured connection.

In some circumstances, clients 18 may attempt communications on improperly secured links, or in violation of security policy. For example, a security application operating on client 18 may improperly or incompletely perform validation of a received certificate. Thus, client 18 may unwittingly use an invalid certificate. As another example, a particular server 20 that supports secured communications may have this capability hidden from connecting clients 18 by a third party. For instance, a third party could intercept messages passed between client 18 and an SMTP mail server 20. By altering the communications, the third party could remove any capability advertisements indicating that the SMTP server 20 supports secured communications. Client 18 would then be unaware that the SMTP server 20 supported secure communications. As yet another example, clients 18 may violate security policies established for an organization. For instance, an SMTP mail server 20 may advertise the availability of secured communications, while the connecting client 18 chooses not to use this available feature. Given these or any other security anomalies, clients 18 and servers 20 may continue communications despite potential or guaranteed security breaches. To prevent and/or protect against these and other security anomalies, firewall 12 may monitor network traffic and react to detected anomalies.

Firewall 12 represents hardware and/or appropriate controlling logic capable of monitoring communications to detect and respond to security anomalies. According to particular embodiments, firewall 12 monitors network traffic and insures proper setup of secured links between clients 18 and servers 20. Firewall 12 may also or additionally enforce security policies, such as a policy established for all users of enterprise network 14. Upon detecting a security anomaly, such as an improper setup or policy violation, firewall 12 can take appropriate action. According to particular embodiments, firewall 12 cuts off communications given a security anomaly. Additionally or alternatively, firewall 12 may simply report the anomaly, such as to an administrator or log, to enable subsequent responses. The action taken by firewall 12 may depend on the type of anomaly detected and/or configurations.

To detect anomalies, firewall 12 monitors network traffic. Upon detecting a new connection between client 18 and server 20, firewall 12 can ensure that proper security measures are taken. As an example, consider client A connecting to a port of server X designated for secured communication. During setup for this connection, server X may communicate a certificate to client A. Firewall 12 examines and validates the certificate, potentially using validation procedures not performed by client 18. For example, firewall 12 may perform all available security processing checks, such as validating the expiration; checking, if possible, that the server name matches to that identified in the certificate; checking the entire chain of authority; verifying the root signature; and checking the certificate against one or more CRLs 22. Using these validations procedures, firewall 12 can determine whether a security anomaly occurs, and if so, whether client A continues to attempt communications with server X. If so, firewall 12 can take appropriate action, such as terminating the connection or generating an alert. For example, firewall 12 can disrupt communications between client 18 and server 20 using appropriate techniques, such as blocking of packets communicated between the devices.

As another example, consider client A connecting to server X using a protocol that supports switching from unsecured to secured links. If server X indicates support for security procedures and client 18 does not choose to use these procedures, then firewall 12 may respond based upon policy considerations. For example, if security policies in place dictate that clients 18 will always use secure links when available, firewall 12 may respond appropriately when client 18 declines to use the available secure link. If server X indicates support for security procedures and client A chooses to use these procedures, firewall 12 can perform similar certificate checking functions as detailed above when a certificate is exchanged. If server X should support secure procedures, yet does not advertise this capability, firewall 12 may respond to this as a security anomaly. For example, firewall 12 may maintain a list of servers 20 that support security protocols and, if one of these servers 20 does not advertise this capability, may respond appropriately. Thus, using these and other similar or appropriate techniques, firewall 12 may detect and respond to security anomalies.

As noted above, the particular configuration illustrated and accompanying description provide only a particular embodiment for implementing this concept. It should be understood that system 10 contemplates using any appropriate component to monitor and respond to security anomalies in one or more network applications. For example, while shown as occurring within firewall 12 providing a link between enterprise network 14 and data network 16, these operations may occur within any appropriate part of system 10 capable of monitoring and responding to security anomalies. For example, some or all of the capabilities described with respect to firewall 12 may be provided within one or more clients 18, such that an individual client 18 can monitor one or more underlying network applications. However, the following description will focus in greater detail upon functional elements and operation of firewall 12 in monitoring and reacting to security anomalies.

Figure 2:
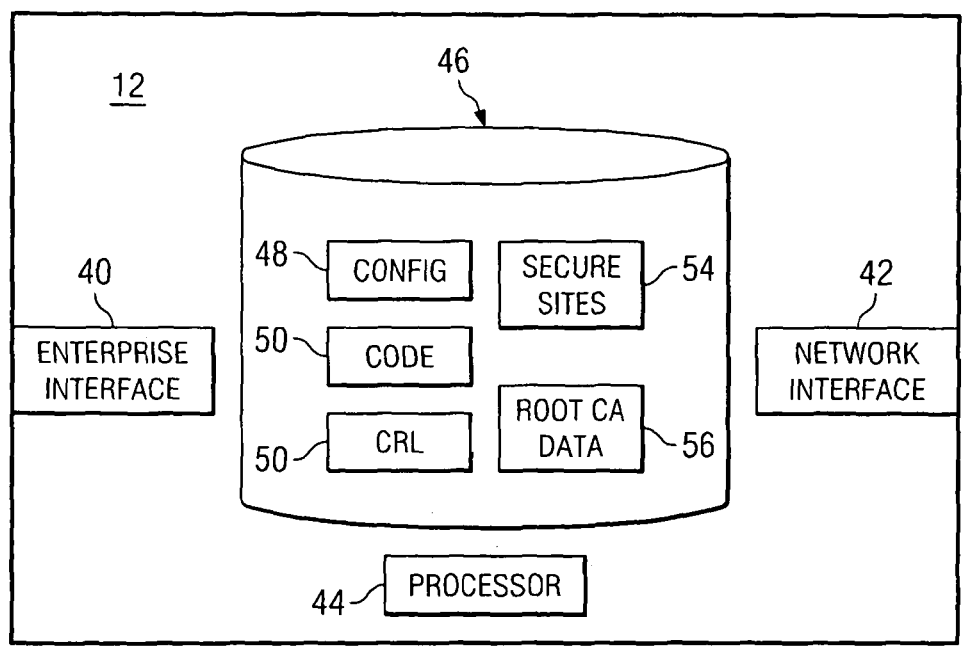
FIG. 2 is a block diagram illustrating exemplary functional components of the firewall.

FIG. 2 is a block diagram illustrating exemplary functional components of firewall 12, including an enterprise interface 40, a network interface 42, a processor 44, and a memory 46. These elements may operate to provide security monitoring functionality such as that described above. More specifically, the elements illustrated within firewall 12 may provide for monitoring of network communications to detect and respond to security anomalies.

Enterprise interface 40 and network interface 42 each represent hardware, including appropriate controlling logic, for linking to and interacting with other elements of system 10. To enable this interaction, enterprise interface 40 and network interface 42 may encompass any suitable number and types of communication links capable of communicating using any appropriate protocols. As illustrated in FIG. 1, firewall 12 may provide a link between enterprise network 14 and data network 16. Thus, for example, enterprise interface 40 may link to one or more elements of enterprise network 14, while network interface 42 may link to one or more elements within data network 16. In this fashion, firewall 12 can provide a physical link between the networks. Firewall 12 may thus monitor network traffic passing between enterprise network 14 and data network 16.

Processor 44 represents any suitable combination of hardware and/or controlling logic capable of managing and controlling the operation of firewall 12. For example, processor 44 may include one or more microprocessors capable of loading and executing software applications to perform various functions. However, the configuration and operation of processor 44 may depend upon the particular implementation of firewall 12 within system 10.

In the embodiment illustrated, memory 46 maintains configuration information 48, code 50, a CRL library 52, a secured sites list 54, and root certifying authority data 56. Configuration information 48 includes settings and other data for use in controlling the operation of firewall 12. For example, configuration information 48 may include policy settings controlling the response of firewall 12 to different types of security anomalies. Code 50 includes software, executable files, and/or appropriate logic modules capable when executed to control the operation of firewall 12. For example, code 50 may include executable files capable of performing traffic monitoring to detect and respond to security anomalies. CRL library 52 may include information mirroring and/or supplementing data maintained within one or more remote CRLs 22. Secured sites lists 54 include a listing of those servers 20 capable of supporting secure communications. Root certifying authority data 56 includes information for performing validation of certifying authority signatures within certificates. However, while memory 46 as illustrated includes particular data elements, it should be understood that memory 46 may maintain any suitable information for use in operation of firewall 12.

During operation, firewall 12 monitors network traffic to detect and respond to network anomalies. Firewall 12 may monitor one or more applications operating on one or more devices. Moreover, as previously discussed, firewall 12 may attempt to enhance security for a variety of different types of network connections, such as inherently secured connections and connections in which security is optional. A particular example of the operation of firewall 12 is provided below with respect to FIG. 3.

However, while the embodiment illustrated and the preceding description focus on a particular embodiment of firewall 12 that includes specific elements, system 10 contemplates firewall 12 having any suitable combination and arrangement of elements for providing network security monitoring and response. Therefore, the modules and functionalities described may be separated or combined as appropriate, and some or all of the functionalities of firewall 12 may be performed by logic encoded in media, such as software and/or programmed logic devices. Also, as previously noted, some or all of the functions of firewall 12 may be incorporated within other elements, such as within clients 18. Thus, for example, while illustrated and described as a network firewall, some or all of the functionality described may be provided within any other appropriate element within system 10. Furthermore, only particular elements of firewall 12 are illustrated, and it should be understood that firewall 12 may include any number and type of elements for performing various networking and monitoring functions.

Figure 3:
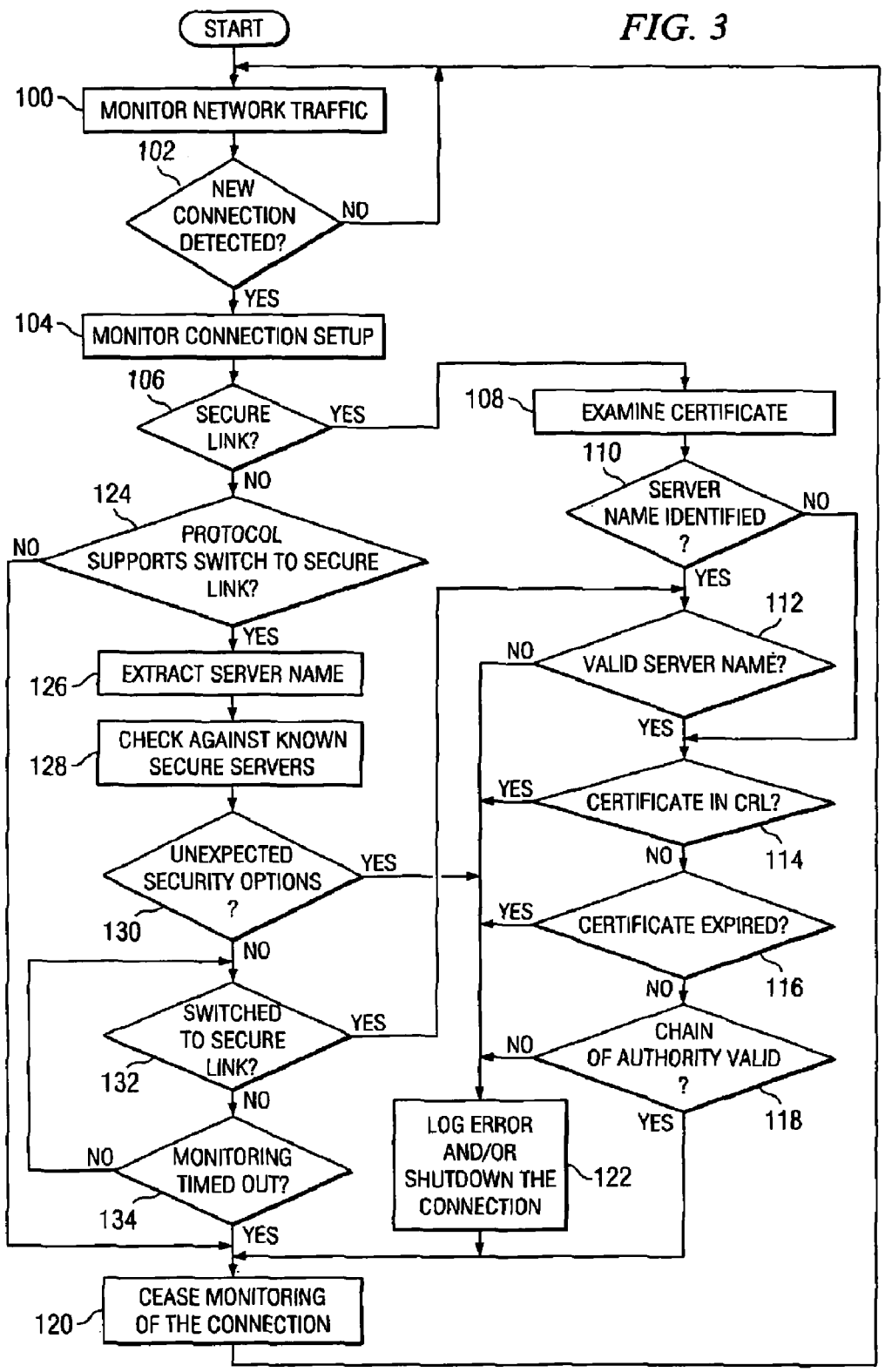
FIG. 3 is a flowchart illustrating a method for monitoring traffic to provide enhanced network security.

FIG. 3 is a flowchart illustrating a method for firewall 12 to monitor network traffic to enhance security of network connections. While the following description will focus on the operation of firewall 12 with respect to this method, it should be understood that similar techniques may be implemented within other elements of system 10 to provide for enhanced network security. Firewall 12 monitors network traffic at step 100. For example, firewall 12 may monitor messages passing between enterprise interface 40 and network interface 42. Firewall 12 determines whether a new connection is detected at step 102. For example, while monitoring network traffic, firewall 12 may detect a new TCP connection established by a particular client 18.

Upon detecting a new connection, firewall 12 monitors the connection setup at step 104 and determines whether the connection indicates an inherently secured link at step 106. For example, as previously discussed, some connections may link to secured ports and/or otherwise indicate the establishment of a secured connection. If the connection is for a secured link, firewall 12 examines the traffic, such as packets received from the remote target of the connection, until identifying a certificate at step 108. Using the certificate, firewall 12 then performs a series of checks to determine its validity.

The certificate under inspection may indicate a server name associated with the certificate. In certain circumstances, firewall 12 may also be able to identify the server name of the remote target of the secured connection. For example, if client 18, using transport layer security (TLS) protocols, transmits a Start TLS message, that message likely identifies the server name for the targeted server 20. Similarly, if client uses a TLS extended client hello procedure, the server name is likely identified in one of the exchanged messages. Therefore, in many instances, messages exchanged between client 18 and server 20 may permit firewall 12 to determine the appropriate name for the targeted server 20.

Firewall 12 thus determines whether this remote server name is identified or identifiable at step 110. If so, firewall 12 determines whether the server name is valid at step 112. For example, firewall 12 may compare the identified server name with the server name listed in the certificate to determine the certificate's validity. Firewall 12 determines whether the certificate has been revoked at step 114. For example, firewall 12 may compare the certificate against locally and/or remotely maintained certificate revocation lists. If the certificate has not been revoked, firewall 12 determines whether the certificate has expired at step 116. To determine this, firewall 12 may simply compare the current time and date against an expiration date maintained within the certificate. If not expired, firewall 12 may validate the chain of authority of the certificate at step 118. To perform this validation, firewall 12 verifies each level of authority down to the root certifying authority for the certificate. In many instances, this may simply include a validation of the root certifying authority, since certificates often do not include nested chains of authority.

After the certificate successfully passes these various validity checks, firewall 12 may cease monitoring of the connection and return to monitoring network traffic at step 100. However, if the certificate fails validation at any step, firewall 12 may take appropriate action at step 122. According to particular embodiments, firewall 12 may log the error to an administrative log and/or shut down the connection. For example, given an invalid certificate, firewall 12 may prevent any future packets from flowing between the connecting client 18 and the connecting server 20. This prevents client 18 from accessing server 20 using a potentially compromised connection.

For an unspecified link, firewall 12 may perform some similar and some additional or alternative steps. Thus, if at step 106 firewall 12 determines that the link is not inherently secured, firewall 12 may perform other steps to monitor for and respond to security anomalies. To perform this monitoring, firewall 12 may first determine whether the protocol supports a switch to a secured link at step 124. If not, security features are not available, and thus firewall 12 ceases monitoring of the connection at step 120. In other circumstances, such as SMTP connections, the protocol in use may support a switch to a secured link. In these instances, firewall 12 extracts the server name from communications at step 126. For example, firewall 12 may monitor packets exchanged between client 18 and server 20 to determine the server name. Using the server name, firewall 12 may check that name against known secured servers at step 128. For example, firewall 12 may access secured sites list 54 to determine whether the server name is expected to offer a secured link. Firewall 12 determines whether the connecting server 20 is offering unexpected security options at step 130. For example, if the connecting server 20 appears within secured sites list 54 as a server that typically offers secured links, yet in this instance the connecting server 20 has not offered this option, this may represent an unexpected security option.

Given such a security anomaly, firewall 12 may respond appropriately at step 122. For example, as discussed previously, firewall 12 may perform actions such as logging an error and/or shutting down the connection.

If firewall 12 detects expected security options, firewall 12 may continue monitoring the connection to detect whether a switch to a secured link occurs at step 132. If not, firewall 12 may continue monitoring the connection setup until the monitoring times out at step 134. However, upon switch to a secured link, firewall 12 may perform similar validity checking steps as described above with respect to an inherently secure link. Therefore, firewall 12 may perform steps such as 112-118 to verify the validity of the certificate received from the connecting server 20.

Thus the preceding flowchart illustrates a particular method for firewall 12 to monitor network connections and enhance security through the detection of security anomalies. However, this flowchart illustrates only an exemplary method of operation, and system 10 contemplates firewall 12 using any suitable techniques, elements and applications for performing similar security enhancing techniques. Thus, many of the steps in this flowchart may take place simultaneously and/or in different orders than as shown. In addition, firewall 12 may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the present appended claims.

What is claimed is:

1. A method for monitoring network traffic to enhance security comprising:
   detecting, at a network firewall device, a network connection established between a client application and a server application across a communications network;
   monitoring packets communicated between the client application and the server application;
   identifying a security certificate communicated from the server application to the client application;
   determining validity of the security certificate;
   determining whether the server application advertises unexpected security options by identifying a server name associated with the server application; checking the server name against a list of known servers that indicates, for each listed server, whether the server supports secure links; and if the list indicates that the server application supports secure links, monitoring for capability advertisements from the server application regarding availability of secure links; and
   if the server application advertises unexpected security options or if the security certificate is not valid, disrupting further communications between the client application and the server application on the network connection.

2. The method of claim 1, further comprising:
   determining that a protocol for the network connection permits unsecure communications;
   detecting a capability advertisement from the server application indicating support for securing of the network connection; and
   if the client application does not attempt to secure the network connection, disrupting further communications between the client application and the server application on the network connection.

3. The method of claim 1, further comprising:
determining that a protocol for the network connection permits unsecure communications;
determining that the client application has not selected to secure the network connection; and
after a predetermined period of time, ceasing monitoring of the network connection.

4. The method of claim 1, wherein determining validity of the security certificate comprises:
verifying that the security certificate has not expired;
verifying each entity identified in a chain of authority established by the certificate; and
checking the security certificate against a certificate revocation list.

5. The method of claim 1, wherein disrupting further communications between the client application and the server application on the network connection comprises:
detecting packets communicated between the client application and the server application; and
dropping the detected packets.

6. A network traffic monitor comprising:
a first interface coupled to a client application;
a second interface coupled to a server application;
a memory maintaining a list of known servers that indicates, for each listed server, whether the server supports secure links; and
a controller operable to:
detect a network connection established between the client application and the server application;
monitor packets communicated between the client application and the server application;
identify a security certificate communicated from the server application to the client-application;
determine validity of the security certificate;
determine whether the server application advertises unexpected security by identifying a server name associated with the server application; checking the server name against the list of known servers; and if the list indicates that the server application supports secure links, monitoring for capability advertisements from the server application regarding availability of secure links; and
if the server application advertises unexpected security options or if the security certificate is not valid, disrupt further communications between the client application and the server application on the network connection.

7. The network traffic monitor of claim 6, wherein the controller is further operable to:
determine that a protocol for the network connection permits unsecure communications;
detect a capability advertisement from the server application indicating support for securing of the network connection; and
if the client application does not attempt to secure the network connection, disrupt further communications between the client application and the server application on the network connection.

8. The network traffic monitor of claim 6, wherein the controller is further operable to:
determine that a protocol for the network connection permits unsecure communications;
determine that the client application has not selected to secure the network connection; and
after a predetermined period of time, cease monitoring of the network connection.

9. The network traffic monitor of claim 6, wherein the controller is further operable to determine validity of the security certificate by:
verifying that the security certificate has not expired;
verifying each entity identified in a chain of authority established by the certificate; and
checking the security certificate against a certificate revocation list.

10. The network traffic monitor of claim 6, wherein the controller is further operable to disrupt further communications between the client application and the server application on the network connection by detecting packets communicated between the client application and the server application and dropping the detected packets.

11. A non-transitory computer readable storage medium encoded with logic for monitoring network traffic to enhance security, the logic operable when executed to:
detect a network connection established between a client application and a server application across a communications network;
monitor packets communicated between the client application and the server application;
identify a security certificate communicated from the server application to the client application;
determine validity of the security certificate;
determine whether the server application advertises unexpected security options by identifying a server name associated with the server application; checking the server name against a list of known servers that indicates, for each listed server, whether the server supports secure links; and if the list indicates that the server application supports secure links, monitoring for capability advertisements from the server application regarding availability of secure links; and
if the server application advertises unexpected security options or if the security certificate is not valid, disrupt further communications between the client application and the server application on the network connection.

12. The non-transitory computer readable storage medium of claim 11, the logic further operable when executed to:
determine that a protocol for the network connection permits unsecure communications;
detect a capability advertisement from the server application indicating support for securing of the network connection; and
if the client application does not attempt to secure the network connection, disrupt further communications between the client application and the server application on the network connection.

13. The non-transitory computer readable storage medium of claim 11, the logic further operable when executed to:
determine that a protocol for the network connection permits unsecure communications;
determine that the client application has not selected to secure the network connection; and
after a predetermined period of time, cease monitoring of the network connection.

14. The non-transitory computer readable storage medium of claim 11, wherein determining validity of the security certificate comprises:
verifying that the security certificate has not expired;
verifying each entity identified in a chain of authority established by the certificate; and
checking the security certificate against a certificate revocation list.

15. The non-transitory computer readable storage medium of claim 11, wherein disrupting further communications between the client application and the server application on the network connection comprises:
  detecting packets communicated between the client application and the server application; and
  dropping the detected packets.

16. A network traffic monitor comprising:
  means for detecting a network connection established between a client application and a server application across a communications network;
  means for monitoring packets communicated between the client application and the server application;
  means for identifying a security certificate communicated from the server application to the client application;
  means for determining validity of the security certificate; and
  means for determining whether the server application advertises unexpected security options by identifying a server name associated with the server application; checking the server name against a list of known servers that indicates, for each listed server, whether the server supports secure links; and if the list indicates that the server application supports secure links, monitoring for capability advertisements from the server application regarding availability of secure links; and
  means for, if the server application advertises unexpected security options or if the security certificate is not valid, disrupting further communications between the client application and the server application on the network connection.

\* \* \* \* \*